United States Patent [19]
French

[11] 3,881,811
[45] May 6, 1975

[54] WIDE-ANGLE REAR VIEW MIRROR WITH ROTARY CENTER PIECE

[76] Inventor: Bruce K. French, 850 San Pascual Ave., Los Angeles, Calif. 90042

[22] Filed: Aug. 8, 1974

[21] Appl. No.: 495,634

Related U.S. Application Data

[63] Continuation-in-part of Ser. No. 119,388, Feb. 26, 1971, abandoned.

[52] U.S. Cl. ............... 350/289; 350/293; 350/303; 350/7
[51] Int. Cl. .............................................. G02b 5/08
[58] Field of Search ........... 350/288, 289, 293, 299, 350/300, 303, 304, 280, 6, 7; 178/7, 6

[56] References Cited
UNITED STATES PATENTS
3,762,802    10/1973    Allen ................................ 350/299

*Primary Examiner*—Ronald L. Wibert
*Assistant Examiner*—Jon W. Henry
*Attorney, Agent, or Firm*—Christie, Parker & Hale

[57] ABSTRACT

A rear view mirror for vehicles has flat portions on opposite sides of a short, curved center piece to provide a field of view in excess of 60°. The center piece is silvered on opposite sides and rotates at a sufficient speed to filter out distorted reflections in the center of the mirror and provide the equivalent of a continuous reflective surface with a curved center portion and flat ends.

7 Claims, 5 Drawing Figures

WIDE-ANGLE REAR VIEW MIRROR WITH ROTARY CENTER PIECE

CROSS-REFERENCE TO RELATED APPLICATION

This is a continuation-in-part of my application Ser. No. 119,388, filed Feb. 26, 1971, now abandoned.

BACKGROUND OF THE INVENTION

This invention relates to mirrors, and more particularly to rear view mirrors for use in automobiles. In a typical automobile or truck, the rear view mirror with which the vehicle is equipped is a flat mirror of approximately 6 inches in length. Because the field of view of such a mirror is relatively limited, on the order of approximately 35° overall, efforts have been made to provide other types of mirrors which increase the viewing angle while at the same time providing a relatively distortion-free reflection to the viewer. Typical of such types of wide-angle rear view mirrors are those illustrated in U.S. Pat. Nos. 2,780,959, 2,911,177, 3,033,396, and 3,063,344.

With one exception, the various mirrors disclosed in the patents cited immediately above provide a rear view mirror which is curved throughout its overall length. Mirrors of this type are a problem because the curved image presented to the viewer is distorted, making it difficult to accurately judge the placement, distance, and size of the object being viewed. The exception is the mirror described in U.S. Pat. No. 2,780,959 which is a rear view mirror having three flat sections joined in an end-to-end relationship. The disadvantage of this type of mirror is that the points of juncture produce a discontinuous reflective surface. This produces a discontinuous reflection to the viewer, which creates confusing gaps between the scenes reflected by the mirror.

SUMMARY OF THE INVENTION

This invention overcomes the problems outlined above and provides a rear view mirror with a viewing angle which is at least comparable, if not in excess, of the viewing angle obtainable with mirrors of the type described in the prior art. The invention produces the equivalent of a continuous reflective surface defined by an essentially flat first portion, and second and third portions which are angularly inclined relative to the plane of the first portion. The angle of inclination extends away and rearwardly relative to the plane of the first portion to form an overall viewing angle in excess of 60°.

The invention avoids the significant amount of distortion characteristic of prior art curved mirrors by providing only a relatively small portion of the total overall length of the mirror in an actual curved configuration, with the curved portion of the mirror bridging the gap between two flat sections which are located on opposite sides of the curved portion. Moreover, the curved intermediate section is provided by a rotary center piece which rotates at a sufficient speed to filter out the distorted reflections in the curved portion of the mirror. The rotary center piece is mounted with very small clearance between it and the flat sections on opposite sides of it to provide the equivalent of a smooth and continuous transition between the three portions of the mirror, which avoids the discontinuities and sharp angles inherent in certain other types of prior art rear view mirrors.

The rear view mirror of this invention sweeps out a substantially larger viewing angle than is presently possible with known conventional flat mirrors, providing a significant increase in the safety of operation of the vehicle on which it is mounted, since a number of blind spots heretofore characteristic of such rear view mirrors are eliminated. By providing a predetermined amount of curvature such that the flat portions of the mirror define an angle of approximately 17° relative to each other, a viewing angle of slightly less than 90° is obtained. By proper mounting of the rear view mirror relative to the centerline of the vehicle and the operator of the vehicle, one-half of the viewing angle is available to the right of the centerline of the vehicle in which the mirror is mounted, and the remaining half is available to the left of the vehicle centerline.

BRIEF DESCRIPTION OF THE DRAWINGS

These and other aspects of this invention will be more fully understood by referring to the following detailed description and the accompanying drawings in which.

DETAILED DESCRIPTION OF THE PREFERRED EMBODIMENTS

Figure 1:
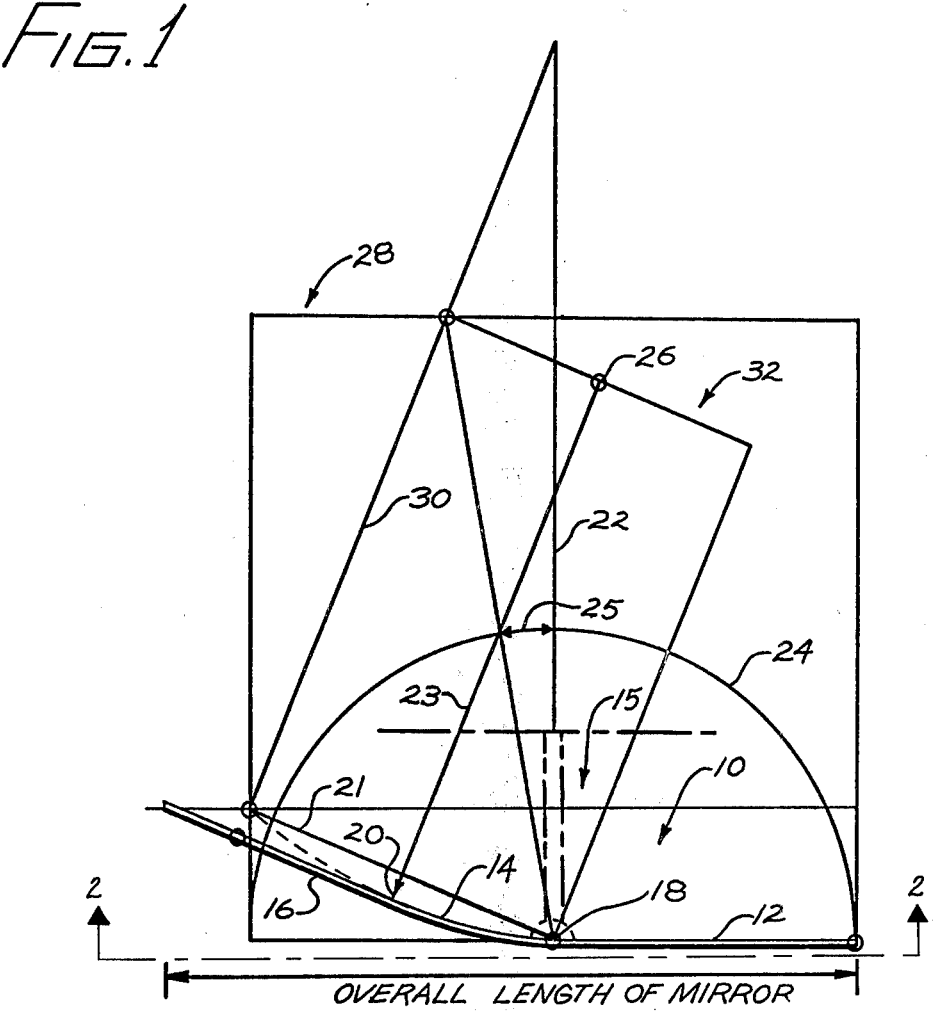
FIG. 1 is a plan view showin a single one-piece mirror with a curved center section according to the present invention.

Referring to FIG. 1, a mirror 10 includes a first portion 12, a second portion 14, and a third portion 16. The first portion 12 extends to one side of a center point 18 for the mirror and is essentially flat and extends for approximately one-half of the overall length of the mirror 10. The second portion 14 extends from the center point 18 away from first portion 12 and is cylindrically curved in a manner and amount of curvature which will be described in greater detail below. The second portion 14 is joined to the first portion 12 at the center point 18 such that a smooth, continuous transition is provided without any sharp breaks or angles. Similarly, a point of juncture 20 between the second portion 14 and the third portion 16 also is smooth and continuous without discontinuity or angle, such that the entire mirror is a single smooth continuous reflective surface having a curved portion interposed between two flat portions.

A swivel mounting 15 (shown in phantom line in FIG. 1) mounts the mirror at, or closely adjacent to, the front windshield of a vehicle to reflect the scene to the rear of the vehicle to a person located in the driver's seat. In the embodiment shown, the swivel mounting 15 is attached to the rear of the mirror at center point 18 and can be angularly adjusted about that point to provide the desired orientation of the mirror. In a preferred embodiment, the mirror is oriented so that the flat portion 12 is perpendicular to the centerline 22 of the vehicle.

Various reflective materials are suitable for use with the mirror of the present invention including, but not limited to, a conventional silvered mirror and a polished metal surface, with the glass in the mirror being of substantially uniform thickness throughout the overall length of the mirror.

The location of the center of curvature for the curved second portion 14 is determined in the following manner. An angle of 22½° defined by a line 21 is constructed at center point 18, the point of juncture between mirror portions 12 and 14. A perpendicular 22 to the flat first portion 12 of the mirror, which happens to be coincident with the centerline of the vehicle, extends through point 18, and a circular arc 24 having a radius equal to the length of the first portion 12 is struck using the junction point 18 as the center of the arc. An angle 25 of 11¼° is then measured along the arc 24 on the side of perpendicular 22 opposite the flat first portion 12 of the mirror. A line 23 perpendicular to line 21 is then extended through the end of angle 25 to locate the line on which the center of curvature of the curved portion 14 lies. The actual center of curvature 26 of the curved portion 14 of the mirror is located by constructing a square 28 with each side dimension being equal to twice the length of the flat first portion 12 of the mirror. By extending a perpendicular 30 to line 21 at the point of juncture between line 21 and the side of square 28 and completing the construction of a rectangle 32 defined by lines 21 and 30, center point 26 is located at the intersection of line 23 and side of rectangle 32 opposite line 21. An arc is constructed using center point 26 as the center of a circularly curved arc extending from junction point 18 to point 20 on line 23 to provide the curvature of the cylindrically curved second portion 14 of the mirror. The flat third portion 16 of the mirror is provided by constructing a flat extension from the point of juncture 20 between arc 14 and line 23. In a preferred embodiment, the length of the third portion 16 extends approximately to the point of intersection with the side of square 28.

Figure 2:
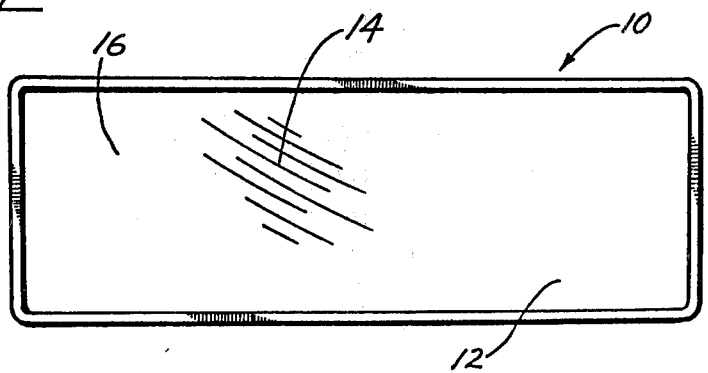
FIG. 2 is an elevation view taken on line 2—2 of FIG. 1.
Figure 3:
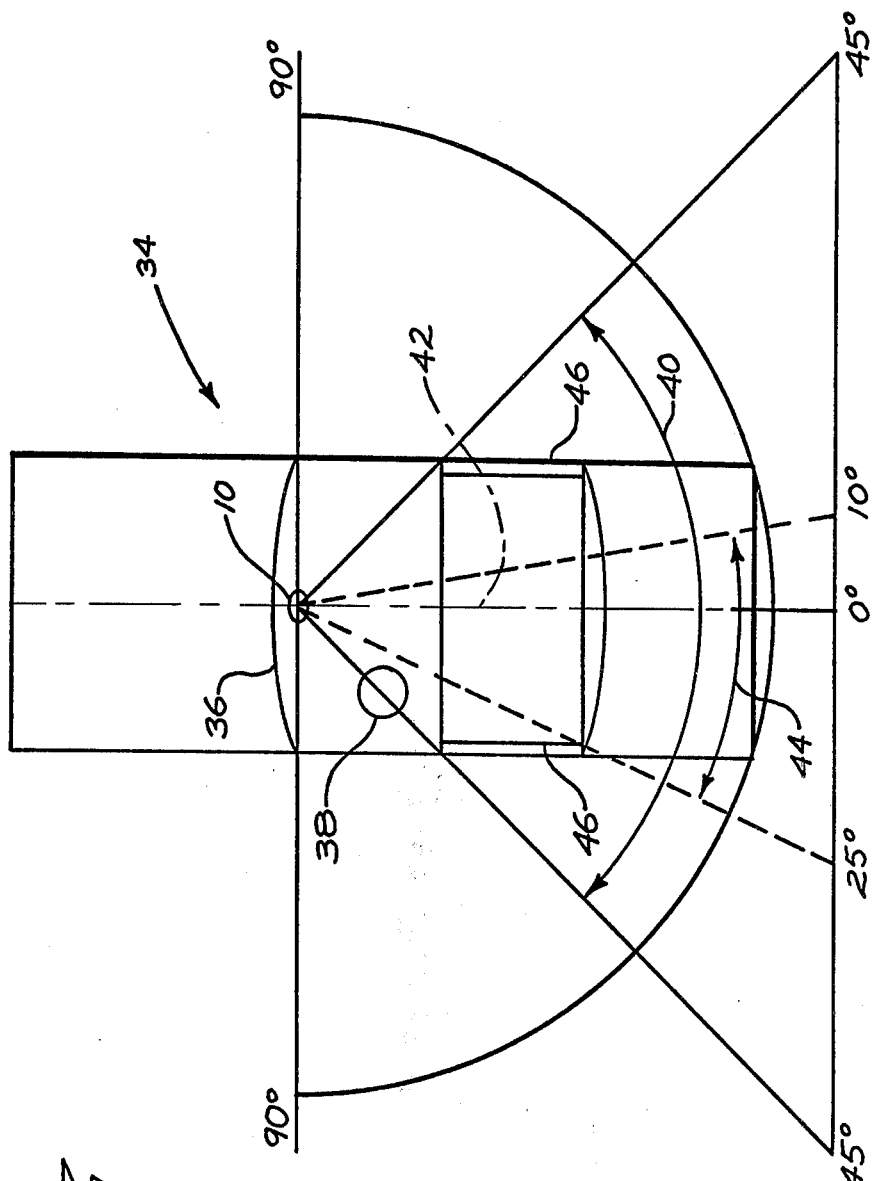
FIG. 3 is a plan view of the viewing angle obtainable with the mirror shown in FIGS. 1 and 2 as mounted in a typical vehicle.

FIG. 3 shows the viewing angle obtainable by the mirror shown in FIGS. 1 and 2. As illustrated in FIG. 3, the mirror 10 is mounted in a vehicle 34 adjacent the vehicle windshield 36. In a conventional vehicle the driver 38 is located on the left-hand side of the automobile and is provided with a viewing angle 40 of 90°, half of this viewing angle being available to the right of the vehicle centerline 42 and the remaining half being available to the left of the centerline 42. For the purposes of illustration, a viewing angle 44 of a conventional rear view mirror is shown in phantom outline illustrating the 10° of viewing angle available to the right of the centerline 42 and the 25° of viewing angle available to the left of the centerline. As can be clearly seen from the illustration in FIG. 3, the viewing angle provided by the mirror 10 of this invention is sufficiently increased to provide the driver with a view through the entire length of both of the rear side windows 46 of the vehicle, eliminating as much as possible the blind spots not covered by the viewing angle swept out by conventional type of rear view mirrors. The example shown in FIG. 3 is representative only, and the specific viewing angle swept out by the rear view mirror of the present invention will vary depending upon the specific placement and angle of the mirror relative to the windshield, the overall length of the vehicle, and in addition the placement of the rear side windows.

The physical dimensions of the mirror may vary depending upon the particular application and vehicle type with which the mirror is used. Two typical overall lengths for such mirrors are 6 inches and 9 inches. In the 9-inch embodiment, the flat first and third portions 12 and 14 are approximately 4 inches and 3 inches in length, respectively, while the curved portion is approximately 2 inches long. The height of such embodiments is on the order of 2 inches to 3 inches. When the mirror is mounted with the junction point 18 coinciding with the centerline 42 of the vehicle, that portion of the mirror on the right-hand side of the centerline is flat, and the curved portion of the mirror is confined to the left-hand side, reducing the amount of distortion due to the curvature of the mirror to a minimum since the curved portion of the mirror faces toward the viewer when he is seated in the driver's location.

Figure 4:
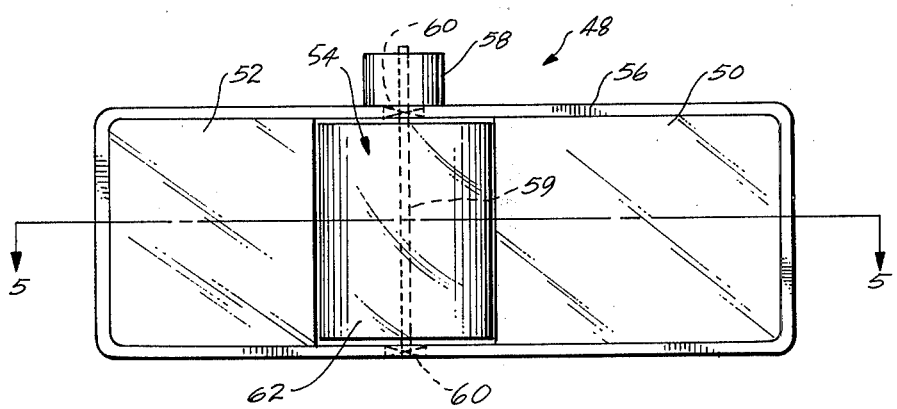
FIG. 4 is an elevation view showing a mirror with a rotary center piece according to this invention.
Figure 5:
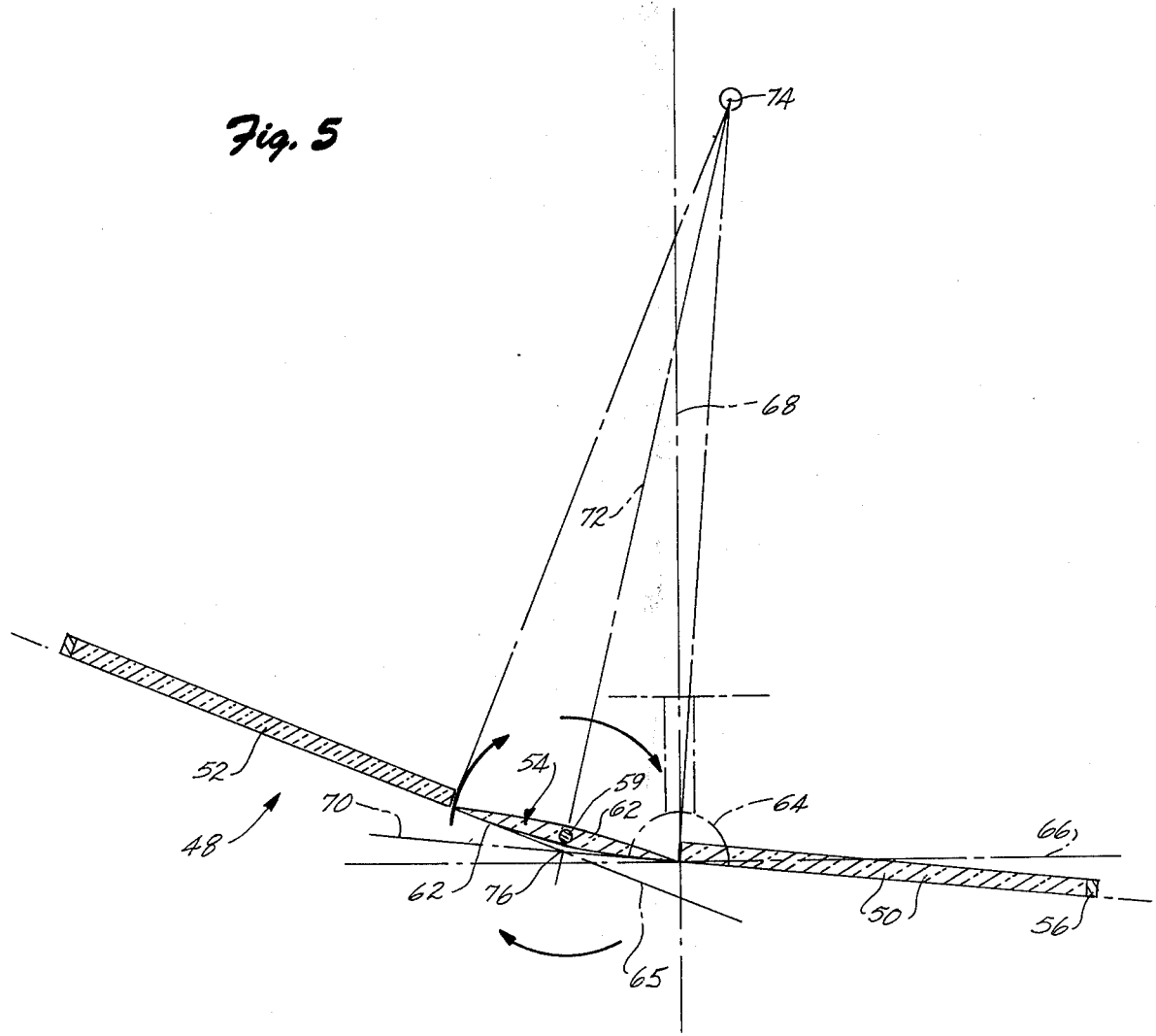
FIG. 5 is a cross-sectional plan view taken on line 5—5 of FIG. 4.

FIGS. 4 and 5 show an alternate, presently preferred form of the invention which includes a mirror 48 having a flat right-hand portion 50, a flat left-hand portion 52, and a curved rotary center piece 54 between the flat right and left-hand sections 50 and 52. A generally rectangular frame 56 mounts the right and left-hand mirror sections 50 and 52 and also provides a stable mounting for a small d.c. motor 58 which rotates the curved center piece 54 about a vertical axis through the center of the rotary center piece 54. Preferably, the motor 58 is a 6 or 12 volt d.c. drive motor, about the size of a small clock motor, which is driven by voltage supplied by the automobile's storage battery. A rotary output shaft 59 connected to the motor 58 extends vertically through the center of the rotary center piece 54 and is mounted in bearings 60 which are preferably incorporated into the mirror frame 56 at the top and bottom of the rotary center piece. Clearances as small as practical, say about one sixty-fourth to 0.01 inch, are provided between the opposite ends of the curved rotary center piece and the adjacent ends of the flat mirror sections 50 and 52 in order to preserve the mirror image continuity as described above for the one-piece mirror 10.

As shown best in FIG. 5, the rotary center piece 54 provides two opposite curved reflective surfaces 62 of identical curvature. The curvature of each reflective surface 62 is essentially the same as that described above for the curved portion 14 of the mirror 10. The rotary center piece 54 is silvered on both sides to provide a continuous reflection during rotation of the center piece.

The detailed construction of the mirror 48 is understood best by referring to FIG. 5. Preferably, the mirror is mounted in a vehicle (not shown) by a suitable swivel mounting shown in phantom line at 64. In a preferred embodiment the mirror 48 is oriented so that the plane of the flat left-hand section 52 (represented by phantom line 65) extends at an angle of about 22½° relative to a perpendicular 66 to the centerline 68 of the vehicle. The plane of the flat right-hand section 50 (represented in phantom line at 70) is inclined toward the viewer at an angle of about 5½° relative to the perpendicular 66. Preferably, the length of the right-hand section 50 is about 3 inches, and the length of the left-hand section 52 is also about 3 inches. The diameter of the rotary center piece preferably is 1.63 inches. The curvature of each reflective surface 62 of the rotary center piece 54 is defined by a radius 72 which extends from a center of curvature 74 along an axis through the center shaft 59 of the rotary center piece. The radius of curvature 72 is tangent to the planes 65 and 70 of the left and right-hand sections 52 and 50, respectively, at the ends of the rotary center piece 54.

Preferably, the curvature of the rotary center piece 54 and the angle of inclination of the right-hand mirror section 50 are related so that the plane 70 of the right-hand section 50 intersects the radius of curvature 72 of the rotary center piece 54 at a point 76 which is collinear with the center shaft 59 and the center of curvature 72. During use of the mirror, this construction provides a truer image projection than when the flat right-hand section 50 is in the plane of the perpendicular 66, although in the latter instance the image projection is still quite acceptable.

During use of the mirror 48, the rotational motion of the rotary center piece 54 tends to bring images reflected by the curved center piece into correct proportion by filtering out any distortions which would otherwise be produced in the curved mirror section. The speed of rotation of the curved center piece 54 is controlled to the particular speed which will minimize all image distortions and bring all viewed objects into proper perspective. This speed of rotation is a relatively high speed so that actual rotation of the center piece is not ordinarily distinguishable to the eye. Preferably, the speed of rotation is on the order of about 720 rpm, which is based on a motion picture frame speed of 24 frames per second (divided by two because of the opposite silvered surfaces of the rotary center piece).

Thus, while most all stationary bent and curved mirrors bring about some distortion of the image, the mirror 48 with the rotary center piece 54 eliminates this known aberation and provides a stable true image projection along the curve, with unnoticeable transition into the flat left and right-hand sections.

I claim:

1. A rear view mirror for vehicles comprising:

first, second, and third reflective portions forming an essentially continuous reflective surface, the first and third portions being flat planar surfaces, the second portion having a cylindrically curved surface of a predetermined length, the second portion being located intermediate the first and third portions, but closely spaced relative thereto so as to form the equivalent of a continuous reflective surface;

means for rotating the second portion of the mirror about an axis located between and generally parallel to the ends of the flat first and third portions of the mirror, the second portion of the mirror being rotatable at such a speed of rotation that the second portion, in combination with the first and third portions, provides an essentially continuous, unbroken reflection to a viewer in the vehicle; and means for mounting the mirror defined by the first, second, and third reflective portions in a vehicle.

2. A mirror according to claim 1 in which the means for mounting the mirror are located on the side thereof opposite the reflective surface, and the curvature of the rotary second portion of the mirror is such that the planar first and third portions of the mirror define predetermined angles of inclination relative to each other such that when the mounting means mounts the mirror in the vehicle with the reflective first portion located essentially transverse to the longitudinal axis of the vehicle and the second and third portions are located on the side of the vehicle longitudinal axis adjacent the driver's location and with the second and third reflective portions extending in a direction remote from the driver, the continuous reflective surface provides an overall viewing angle in excess of 60°.

3. A mirror according to claim 1 in which the diameter of the curved rotary portion of the mirror is about 20 percent of the overall length of the mirror.

4. A mirror according to claim 3 in which the curvature of the rotary second portion is tangent at its opposite ends to the planes defining the flat first and third portions of the mirror.

5. A mirror according to claim 1 including reflective surfaces on opposite curved surfaces of the rotary section portion of the mirror.

6. A mirror according to claim 5 including means for rotating the curved second portion of the mirror about an axis extending between and generally parallel to the ends of the flat first and third portions which are adjacent the opposite ends of the curved second portion.

7. A mirror according to claim 1 in which the planes defining the first and third portions of the mirror intersect at a point which is collinear with a line representing the radius of curvature of the curved second portion and extending through the center of rotation thereof.

* * * * *